United States Patent [19]
Buese

[11] Patent Number: 5,576,453
[45] Date of Patent: Nov. 19, 1996

[54] STABLE, STERICALLY-PROTECTED, BONDED PHASE SILICAS PREPARED FROM BIFUNCTIONAL SILANES

[75] Inventor: Mark A. Buese, Gainesville, Fla.

[73] Assignee: ES Industries, Berlin, N.J.

[21] Appl. No.: 276,339

[22] Filed: Jul. 18, 1994

[51] Int. Cl.[6] ...................................................... C07F 7/08
[52] U.S. Cl. ........................... 556/400; 556/9; 556/10; 556/12; 556/466; 556/482
[58] Field of Search ................................. 556/400, 9, 10, 556/12, 482, 466

[56] References Cited

U.S. PATENT DOCUMENTS

| | | | |
|---|---|---|---|
| 4,470,474 | 10/1984 | Sawicki | 556/400 X |
| 4,705,725 | 11/1987 | Glajch et al. | 428/405 |
| 4,824,950 | 4/1989 | Barcza | 556/400 X |
| 4,894,468 | 1/1990 | Wilchek et al. | 556/400 X |
| 5,374,755 | 12/1994 | Neue et al. | 556/400 |

*Primary Examiner*—Paul F. Shaver
*Attorney, Agent, or Firm*—Law Offices of Jane Massey Licata

[57] ABSTRACT

Compositions of Formula (I):

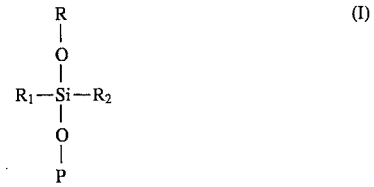

wherein R is a group selected in accordance with an intended application; $R_1$ and $R_2$ are protecting groups; and P is a substrate are provided. Methods of producing these compositions are also provided.

6 Claims, 1 Drawing Sheet

STABLE, STERICALLY-PROTECTED, BONDED PHASE SILICAS PREPARED FROM BIFUNCTIONAL SILANES

BACKGROUND OF THE INVENTION

Bonded-phase silicas commonly used in chromatographic applications have been described in a variety of publications and are well-known in the art. The preparation of these stationary phases has been described using monofunctional, bifunctional and trifunctional silanes. The bonded silicas described however, did not use sterically-protecting groups, and thus have been found to be relatively unstable over a wide variety of operating conditions.

In general a reverse phase chromatography column containing a bonded silica as the stationary phase is stable over a relatively narrow pH range. Frequently the pH must be maintained at a prescribed pH, or the column undergoes irreversible damage losing its efficiency and characteristics, such as the ability to produce narrow peaks, desirable retention volumes or resolve components of a mixture. This damage can occur even if the mistaken use outside the narrow pH range defined for the column is only for a short period of time. In many cases, these stationary phases are produced by reacting an alkyldimethylchlorosilane, alkyldimethylalkoxysilane, or alkyltrialkyloxysilane with a silica in the presence of a base such as pyridine to form a siloxane bond to the surface.

In U.S. Pat. No. 4,705,725, a stable support structure comprising a substrate to which is attached a monofunctional silane containing two sterically-protecting groups R and an additional functional group R' is disclosed. The compounds disclosed in the patent are represented by the following Formula (A):

where R=isopropyl, t-butyl, sec-butyl, sec-pentyl, isopentyl or cyclohexyl; R'=alkane, substituted alkane, alkene, substituted alkene, aryl or substituted aryl and A=a surface group of a substrate to which the silane is covalently attached. The sterically-protecting R groups were found to impart surprising stability to these support structures. These silanes are produced by the hydrosilation of an alkene by chloro-di-(2-propyl)silane which uses an expensive catalyst and generally occurs in a relatively low quantitative yield requiring separation of the product from the starting materials.

In the specification of the '725 Patent, it is taught that the silicon atoms within the silane of this invention must be monofunctional (col 5–6, lines 66–68 and 1–16, respectively). It is taught that multifunctional reagents will tend to polymerize during reaction or use, resulting in irreproducible surfaces with different chemical and physical characteristics. It is also taught that multifunctional silanes only partially react with a surface, leaving a reactive group that can ultimately undergo unwanted reactions with materials being handled or hydrolyze to acidic silanols that can deleteriously interact with materials of interest.

It has now been unexpectedly found that bifunctional silanes containing two-sterically protective groups can be used to produce reproducible and stable covalently-bonded silanes. The synthesis of these silanes does not require a hydrosilation step and permits the preparation of a wide variety of functional silanes displaying stability over a wide range of pHs.

SUMMARY OF THE INVENTION

An object of the present invention is to provide a composition of Formula (I):

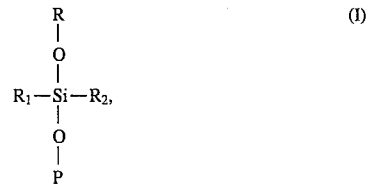

wherein

R is a group selected in accordance with an intended application;

$R_1$ and $R_2$ are protecting groups; and

P is a substrate.

Another object of the present invention is to provide uses of these composition in chromatographic applications.

Yet another object of the present invention is to provide a method of synthesizing compositions of Formula (I) which comprises binding a bifunctional silane of Formula (II):

wherein X is a reactive group which is more reactive than the OR group of the silane and R, $R_1$ and $R_2$ are as defined in Formula (I), with a substrate P.

DETAILED DESCRIPTION OF THE INVENTION

Figure 1:
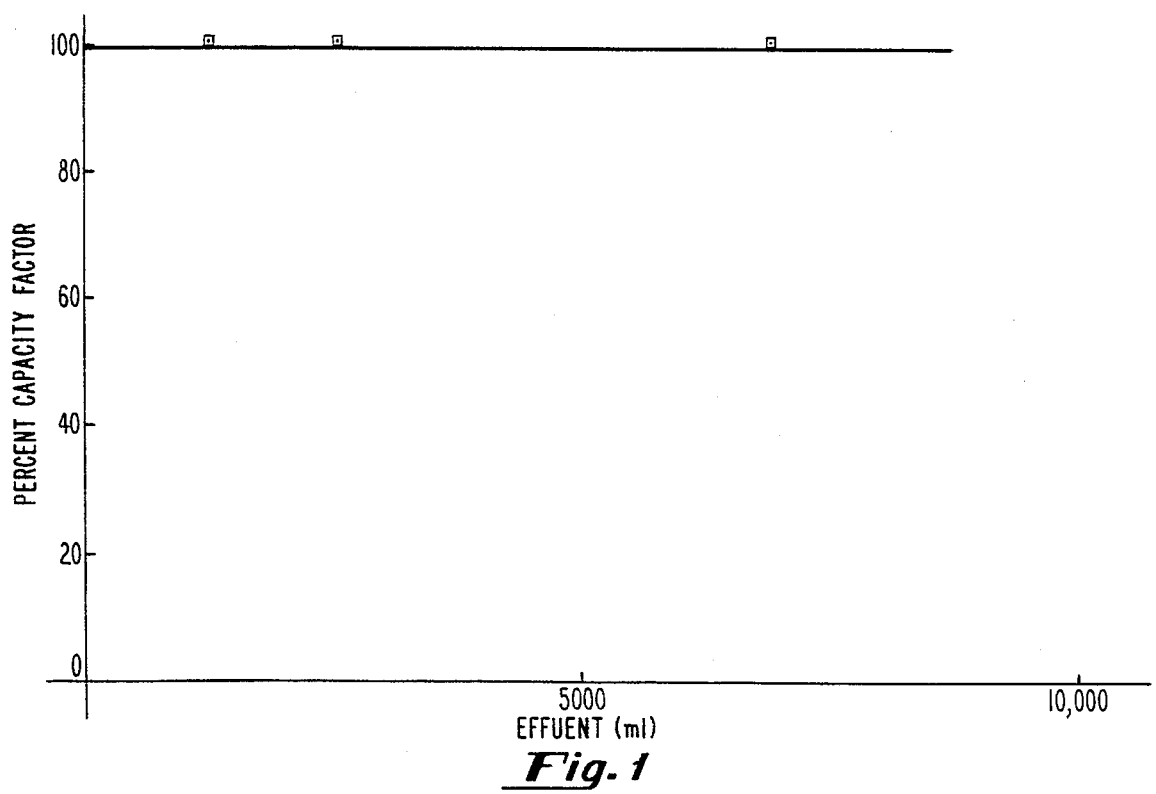
FIG. 1 is a line graph showing the capacity factors of toluene (k') as a function of volume effluent passed through a high pressure liquid chromatography column (25 cm length×4.6 mm I.D.) packed with the composition prepared as described in Example 2. The effluent was 19:1 acetonitrile:water containing 2% trifluoroacetic acid adjusted to pH 2.0 with concentrated ammonium hydroxide. The flow rate of the mobile phase was 1 ml/min. The capacity factors of toluene were measured with 30:70 water:acetonitrile containing 20 mM acetic acid adjusted to pH 7.0 with concentrated ammonium hydroxide.

This present invention relates to stable compositions comprising a substrate bonded with a sterically protected silane. Compositions of the present invention comprise an appropriate reactive solid to which a bifunctional silane is monofunctionally attached to yield a covalently stable bonded silane, —$SiR_1R_2(OR)$, that contains at least two sterically-protecting groups, $R_1$ and $R_2$, attached to the silicon atom of the silane. The structure is represented by the following Formula (I):

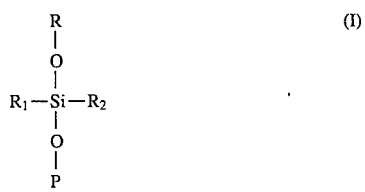

wherein R is a group selected in accordance with the intended application, $R_1$ and $R_2$ are sterically-protecting groups and P is a substrate. These compositions permit the fabrication of functionalized silica particles which are stable to hydrolysis over a wide pH range, from about 2 to about 7.5. The compositions of the present invention are useful in a variety of applications including, but not limited to, efficient, highly stable packings for chromatographic separations both for analysis and large-scale isolations; stable, selective media for affinity chromatography separations; stable surface-modifications of fuse-silica capillaries for use in capillary electrophoresis; high-selective catalyst for liquid-phase reactions; the solid-phase synthesis of peptides, proteins, and oligonucleotides; stable, efficient matrices in peptide and nucleotide synthesizing-instruments; and, highly selective phases in peptide and protein sequencing. Other possible uses for these compositions will become apparent to those of skill in the art based upon this disclosure.

The compositions of the present invention can contain a variety of functional groups, R, selected to fit the intended application or use. In a preferred embodiment, R is selected from a group consisting of alkyl, substituted alkyl, alkenyl, substituted alkenyl, aryl and substituted aryl. Selecting an appropriate R group for the intended application is routinely accomplished by one of skill in the art upon this disclosure. For example, if the intended use for the composition is in reverse-phase chromatography, R may be an alkyl or aryl group. Examples of appropriate R groups include, but are not limited to, C3, C4, n-C8, and n-C18. These groups enable the desired hydrophobic interaction for retention to occur. If the intended use is for ion-exchange chromatography, R can contain groups with an ion-exchange function. Examples include, but are not limited to, anion exchangers such as 3-(trimethylammonium)propyl and 3-(tributylammonium)propyl, and cation exchangers such as 3-(4'-phenylsulfonic acid)propyl. In size exclusion chromatography, highly polar R groups can be selected. Groups such as —$(CH_2)_3$—O—CH(OH)—CHOH may be selected for the separation of highly polar, water-soluble biomacromolecules such as proteins by size exclusion chromatography. Similar polar R groups can be used in hydrophobic interaction chromatography where proteins elute by decreasing ionic strength. In normal phase chromatography, the selected R group would be a polar functional group such as $(CH_2)_3$—$NH_2$ or $(CH_2)_3$—CN. If the intended use is affinity chromatography, the substrate P may be reacted with a bifunctional silane having an R group which is reactive. An example is $(CH_2)_3$—$NH_2$. The R group is further reacted with ligands having a specific biological activity needed to perform the desired separation. The compositions of the present invention also provide an important tool in binding chiral-recognizing selectors to the surface of the chromatographic-supports. Attached cyclodextrins or their derivatives for the separation of racemates under reversed-phase or normal-phase conditions; bonded hydroxy-substituted amines, acids or amino acids and their derivatives for normal-phase separation of racemates through H-bonds and/or π-π-interactions, or chiral ligand-exchange enantiomeric-resolution are some examples of useful chiral-recognizing selectors.

By $R_1$ and $R_2$ being referred to as "sterically-protecting groups" it is meant to include any group capable of providing steric protection to the Si—O groups of the composition. $R_1$ and $R_2$ can be the same or different. It is preferred that these groups, $R_1$ and $R_2$, because of their configuration, be able to closely pack around the Si—O groups of the silane during hydrolytic attack. Examples of $R_1$ and $R_2$ groups include, but are not limited to, isopropyl, t-butyl, sec-butyl, isobutyl, sec-pentyl, isopentyl, cyclopentyl, and cyclohexyl. The bulkiness of the sterically-protecting group directly affects the concentration of —OR groups on the substrate P by limiting the amount of the silane moieties which can attach to the surface. Increasing the bulkiness of these groups can reduce the amount of silanes that can be attached to the surface. For example, a silane with two 3-pentyl groups will bond to the surface under optimal conditions in a less dense form than a silane with two 2-propyl radicals. Where the physical and chemical nature of the surface and its chromatographic character and separation usefulness is dependent on the density and chemistry of the R groups, small sterically-protecting groups should be used. The smallest sterically-protecting 2-propyl group will allow the greatest alkoxy-density and highest selectivity of the support and is the preferred sterically-protecting substituent used.

The substrate, P, of the present invention is a solid material having a surface which is capable of reacting with the bifunctional silanes disclosed herein. Examples of appropriate substrates include, but are not limited to, hydrolyzed silica or chromia having available OH groups on the surface and dried silica chlorinated with silicon tetrachloride or thionyl chloride. In one embodiment, the substrate comprises a metal oxide or metalloid oxide. Preferred metal or metalloid oxide substrates include silica, chromia and tin oxide. In another embodiment, the substrate comprises an organic polymer or plastic which will flow under a definite, applied stress. It is preferred that the substrate be stable to reaction temperatures of at least 200° C. In some applications, it may be necessary to coat a rigid substrate with an appropriate metal or metalloid oxide film that can then be made to react with the silane reagents. For example, titania can be coated with a thin layer of silica in accordance with methods well known in the art. This silica layer can then be hydrolyzed and reacted with the selected bifunctional silane.

The silanes used to prepare the compositions of the present invention are bifunctional containing —OR and X in addition to the two sterically-protecting groups, $R_1$ and $R_2$ all attached to the silicon atom of the silane. The bifunctional silanes are represented by the following Formula (II):

wherein X is a reactive group which is more reactive than the OR group of the silane, R is a group selected in accordance with the intended application, $R_1$ and $R_2$ are sterically-protecting groups. For the purpose of this invention the reactivity of a group X is defined by its ability to be displaced by a hydroxyl group attached to the surface of the substrate P. Compositions of the present invention are synthesized by covalently binding a silane of Formula (II) with a substrate P. For example, a silane of Formula II wherein X is $N(CH_3)2$ can be added to a suspension of dry silica in dry toluene. The mixture can then be heated to reflux for about 2 hours to produce a composition of the present invention. In the present invention the X group of the bifunctional silane must have a greater tendency to be displaced by the hydroxyl group attached to the surface of the substrate P than the O—R group. Examples of appropriate X groups include, but are not limited to, amino, amido, enolate, chloro, bromo, iodo, alcohol sulfonyl and aryl sulfonyl groups. These X groups will direct the surface reaction to yield exclusively the desired bonded silane. In addition, using a more reactive leaving group helps to increase and to maximize surface-silane coverage. The silanes needed for the previously known art of sterically-protected silanes were produced, for example, by displacing a chloro group (or groups) of a chlorosilane using an alkylmagnesium bromide (Grignard reagent), or for example, by hydrosilation of an alkene with chlorodialkylsilane. These reactions are limited in their scope, however, particularly when additional polar functional groups are present in either reagents. The silanes of the present invention are produced by displacing, for example, a chloro substituent with an alkanol including such alkanols that contain additional polar groups. Thus, these novel sterically-protected silanes of the present invention and the compositions produced can be made in a larger variety and at a less expensive manufacturing cost.

The following nonlimiting examples are provided for illustrative purposes only.

EXAMPLES

Example 1: Preparation of di-(2-propyl)octyloxysiloxyl bonded silica

Step I: Di(2-propyl)octyloxysilane was prepared in the following manner. Dry octanol (52.5 g, 0.40 mole) and dry pyridine (32.9 g, 0.42 mole) were added to a 500 ml round-bottom flask. The solution was cooled to −5° C. with stirring. Di(2-propyl)chlorosilane (67.1 g, 0.44 mole) was added in a dropwise fashion over 60 minutes. After this addition, the temperature of the reaction mixture was maintained at −5° C. for another 30 minutes, then allowed to come to room temperature overnight. Hexane (100 ml) was then added to this reaction mixture. The organic phase was extracted with 500 ml 0.1N aq. HCl and 500 ml water. The organic layer was dried over anhydrous magnesium sulfate, filtered and distilled to produce di(2-propyl)octyloxysilane.

Step II: Di(2-propyl)octyloxysilane, (85 g, 0.35 mole) was then added to a 500 ml three-neck round-bottom flask and dissolved in hexane (200 ml). The solution was cooled to −5° C., vigorously agitated and $Cl_2$ gas was bubbled through until a greenish color appeared. Nitrogen gas was blown through to flush off any excess $Cl_2$ reagent and HCl formed during the reaction. The reaction mixture was then distilled to yield a colorless oil, di(2-propyl)octyloxychlorosilane, b.p. 132° C. (0.8 mm Hg) in a 90% yield.

Alternatively, di(2-propyl)octyloxychlorosilane was prepared as follows. To a 1000 ml three-neck round-bottom flask fitted with a stirrer, drying tube, thermometer and dropping funnel was added di(2-propyl)dichlorosilane (28.3 g, 153 mmol) and dry toluene (200 ml). The reaction mixture was then stirred and cooled to −5° C. A solution of dry octanol (10.0 g, 76 mmole) and dry pyridine (6.5 g, 82 mmole) in dry toluene (100 ml) was added dropwise for 60 minutes. The reaction mixture was suspended overnight at room temperature, filtered under a "nitrogen blanket" and fractionated.

Step III: Di(2-propyl)octyloxychlorosilane (61.3 g, 0.3 mole) was then added to a 1000 ml three-neck round-bottom flask. Toluene (600 ml) was also added to the flask. The resulting solution was stirred, cooled in an ice-bath, and dimethylamine gas was passed over the solution until no further precipitation of dimethylamino hydrochloride was observed. The reaction mixture was suspended for another 15 minutes at room temperature and then filtered under anhydrous conditions to produce N,N-dimethylamino-di(2-propyl)octyloxysilane.

Step IV: Silica (45 g) (Nucleosil 50-5, Machery-Nagel, Durhem, Germany) was added to a 1000 ml three-neck round-bottom flask and dried under high vacuum at 200° C. for about 2 hours. The flask was then cooled to room temperature. The filtrate of N,N-dimethylamino-di(2-propyl)octyloxysilane was then added and the mixture was stirred at room temperature for 4 hours and finally refluxed overnight. The resulting suspension was filtered, washed with toluene, methylene chloride, methanol and then again with methylene chloride, and air dried to produce di-(2-propyl)octylsiloxyl bonded silica. Results from elemental analysis of bonded silica: C-9.31% and H-1.93%. The calculated coverage of $C_{14}H_{31}OSi$ on the 393 $m^2/g$ Nucleosil 50-5 silica was 1.63 μmole/$m^2$.

Example 2: Preparation of di(2-propyl)octadecyloxysiloxyl bonded silica

The reaction sequence described in Example 1 was repeated however, octadecanol was substituted for octanol in Step I. Di(2-propyl)octadecyloxychlorosilane was distilled at 215° C. (0.8 mm Hg). Gas chromatographic analysis indicated greater than 98% purity. Results from elemental analysis of bonded silica: C-15.53% and H-3.07%. The calculated coverage of $C_{24}H_{51}OSi$ on the 393 $m^2/g$ Nucleosil 50-5 silica was 1.63 μmole/$m^2$.

Example 3: Preparation of di(2-propyl)(3-phenylpropoxy)siloxyl bonded silica The reaction sequence described in Example 1 was repeated however, 3-phenylpropanol was substituted for octanol in Step I. Di(2-propyl)(3-phenylpropoxy)chlorosilane was distilled at 144° C. (0.8 mm Hg). Gas chromatographic analysis indicated greater than 97% purity. Results from elemental analysis of bonded silica: C-9.61% and H-2.01%. The calculated coverage of $C_{15}H_{25}OSi$ on the 393 $m^2/g$ Nucleosil 50-5 silica was 1.57 μmole/$m^2$.

What is claimed is:

1. A composition of Formula (I):

wherein

R is selected from a group consisting of an alkyl, substituted alkyl, alkenyl, substituted alkenyl, aryl and substituted aryl;

$R_1$ and $R_2$ are sterically-protecting groups; and

P is a hydrate metal oxide, a hydrated metalloid oxide, or an organic polymer.

2. A composition of claim 1 wherein:

$R_1$ and $R_2$ are each selected from a group consisting of secondary alkyls, tertiary alkyls and cyclo alkyls.

3. The composition of claim 1 wherein $R_1$ and $R_2$ are the same.

4. The composition of claim 1 wherein $R_1$ and $R_2$ are different.

5. A method of synthesizing compositions of claim 1 comprising binding a bifunctional silane of Formula (II):

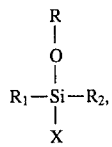

wherein:

X is a reactive group which is more reactive than the OR group of the silane;

R is selected from a group consisting of an alkyl, substituted alkyl, alkenyl, substituted alkenyl, aryl and substituted aryl; and $R_1$ and $R_2$ are sterically-protecting groups, to a substrate P.

6. The method of claim 5 wherein:

$R_1$ and $R_2$ are each selected from a group consisting of secondary alkyls, tertiary alkyls and cyclo alkyls; and X is selected from a group consisting of an amino, amido, enolate, chloro, bromo, iodo, alcohol sulfonyl and aryl sulfonyl.

* * * * *